United States Patent
Augustin et al.

(10) Patent No.: US 9,740,843 B2
(45) Date of Patent: Aug. 22, 2017

(54) METHOD, SYSTEM, LICENSE SERVER FOR PROVIDING A LICENSE TO A USER FOR ACCESSING A PROTECTED CONTENT ON A USER DEVICE AND SOFTWARE MODULE

(75) Inventors: Thomas Augustin, Anif (AT); Oliver Kubera, Salzburg (AT); Martin Aster, Salzburg (AT)

(73) Assignee: SONY DADC AUSTRIA AG, Anif (AT)

( * ) Notice: Subject to any disclaimer, the term of this patent is extended or adjusted under 35 U.S.C. 154(b) by 516 days.

(21) Appl. No.: 12/720,224

(22) Filed: Mar. 9, 2010

(65) Prior Publication Data
US 2010/0250389 A1 Sep. 30, 2010

(30) Foreign Application Priority Data
Mar. 31, 2009 (EP) ..................................... 09004727

(51) Int. Cl.
| | |
|---|---|
| G06Q 30/06 | (2012.01) |
| G06F 21/33 | (2013.01) |
| G06F 21/10 | (2013.01) |
| G06Q 30/08 | (2012.01) |

(52) U.S. Cl.
CPC .............. *G06F 21/33* (2013.01); *G06F 21/10* (2013.01); *G06Q 30/0601* (2013.01); *G06F 2221/072* (2013.01)

(58) Field of Classification Search
CPC ................................ G06Q 30/06; G06Q 30/08
USPC .................... 705/26, 27, 26.1, 27.1
See application file for complete search history.

(56) References Cited

U.S. PATENT DOCUMENTS

| | | | |
|---|---|---|---|
| 5,892,900 A * | 4/1999 | Ginter et al. | .................... 726/26 |
| 7,672,873 B2 * | 3/2010 | Kindig | .................... G06Q 30/02 |
| | | | 705/26.1 |
| 2002/0026581 A1 | 2/2002 | Matsuyama et al. | |
| 2003/0120611 A1 | 6/2003 | Yoshino et al. | |

(Continued)

FOREIGN PATENT DOCUMENTS

| | | |
|---|---|---|
| JP | 2004-133501 A | 4/2004 |
| JP | 2004-302931 A | 10/2004 |
| JP | 2007-65985 A | 3/2007 |

OTHER PUBLICATIONS

CoreMedia Participates in Open Mobile Alliance's Test Fest, Business Editors/High-Tech Writers. Business Wire [New York] Nov. 28, 2003, downloaded from ProQuestDirect on the Internet on Sep. 12, 2012, 3 pages.*

(Continued)

*Primary Examiner* — James Zurita
(74) *Attorney, Agent, or Firm* — Oblon, McClelland, Maier & Neustadt, L.L.P.

(57) ABSTRACT

A method for providing a license to a user for accessing a protected content on a user device is provided, the method comprising: transmitting user authentication data from the user device to a user account server; transmitting user identification data from the user account server to a license server if the user authentication data corresponds to a valid user account on the user account server; checking in the license server, whether the user is entitled to the license; and transmitting the license from the license server to the user device, if the user identification data is validated and if the user is deemed entitled to the license. A corresponding system, a license server and a software module are provided as well.

14 Claims, 5 Drawing Sheets

(56) References Cited

U.S. PATENT DOCUMENTS

| | | |
|---|---|---|
| 2004/0193546 A1 | 9/2004 | Tokutani et al. |
| 2005/0185792 A1 | 8/2005 | Tokutani et al. |
| 2007/0011097 A1 | 1/2007 | Eckleder |
| 2008/0086779 A1 | 4/2008 | Blake et al. |
| 2008/0234047 A1* | 9/2008 | Nguyen .......................... 463/42 |

OTHER PUBLICATIONS

Content protection for games, Myles, G; Nusser, S. IBM Systems Journal 45. 1 (2006): 119-143, downloaded from ProQuestDirect on the Internet on Sep. 12, 2012, 19 pages.*

Office Action issued May 30, 2011 in European Patent Application No. 09 004 727.5-2212.

Office Action issued Nov. 12, 2013 in Japanese Patent Application No. 2010-080442.

* cited by examiner

METHOD, SYSTEM, LICENSE SERVER FOR PROVIDING A LICENSE TO A USER FOR ACCESSING A PROTECTED CONTENT ON A USER DEVICE AND SOFTWARE MODULE

An embodiment of the invention relates to a method, a system and a license server for providing a license to a user for accessing a protected content on a user device. A further embodiment of the invention relates to a software module configured to run on a user device.

BACKGROUND

There exist many ways to distribute encrypted content, which has audio information, video information, text information, binary files etc. to users, while making sure that the users pay some fees to a content provider. The straight forward way is that the user acquires an encrypted file and buys the key for decrypting the file at the content provider. Using the key, the user can decrypt the file to use a decrypted version of the content. This process of acquiring the key might also be referred to as authentication or activation or as acquiring or being provided with a license of the encrypted content. The buying of the key can be performed electronically via the internet. To this end, the user normally accesses a license provider website or an online shop website and answers several questions on his name, email address, address, telephone number, sex, credit card number etc. Thus, the user has to fill in a lot of personal information so that the content provider has enough information to make sure that any fees for the content can be collected from the content buyer.

There are, however, severe limitations in this concept, since an increasing number of internet participants are very reluctant to send their email address to a site, from which the user does not know anything with respect to confidence, etc.

In general, obtained licenses are only valid for a restricted number of computers or user devices. Accordingly a user is not allowed to transfer the protected content to other devices and it is, for instance, very difficult for a user to obtain licenses for other user devices, which might be situated at different places, e.g. in an office, a private home, a car or a secondary residence.

It is an object of the invention to provide a method, a system and a server for accessing protected content on a user device which gives a higher flexibility to the user to access the protected contents on different user devices. This object is solved by a method according to claim 1, a system according to claim 11, a license server according to claim 14 and software module according to claim 15.

Further details of the invention will become apparent from a consideration of the drawings and ensuing description.

BRIEF DESCRIPTION OF THE SEVERAL VIEWS OF THE DRAWINGS

The accompanying drawings are included to provide a further understanding of embodiments and are incorporated in an constitute part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following, embodiments of the invention are described. It is important to note that all described embodiments in the following may be combined in any way, i.e. there is no limitation that certain described embodiments may not be combined with others. Further, it should be noted that same reference signs throughout the figures denote same or similar elements.

It is to be understood that other embodiments may be utilized and structural or logical changes may be made without departing from the scope of the invention. The following detailed description, therefore, is not to be taken in a limiting sense, and the scope of the present invention is defined by the appended claims.

It is to be understood that the features of the various embodiments described herein may be combined with each other, unless specifically noted otherwise.

Figure 1:
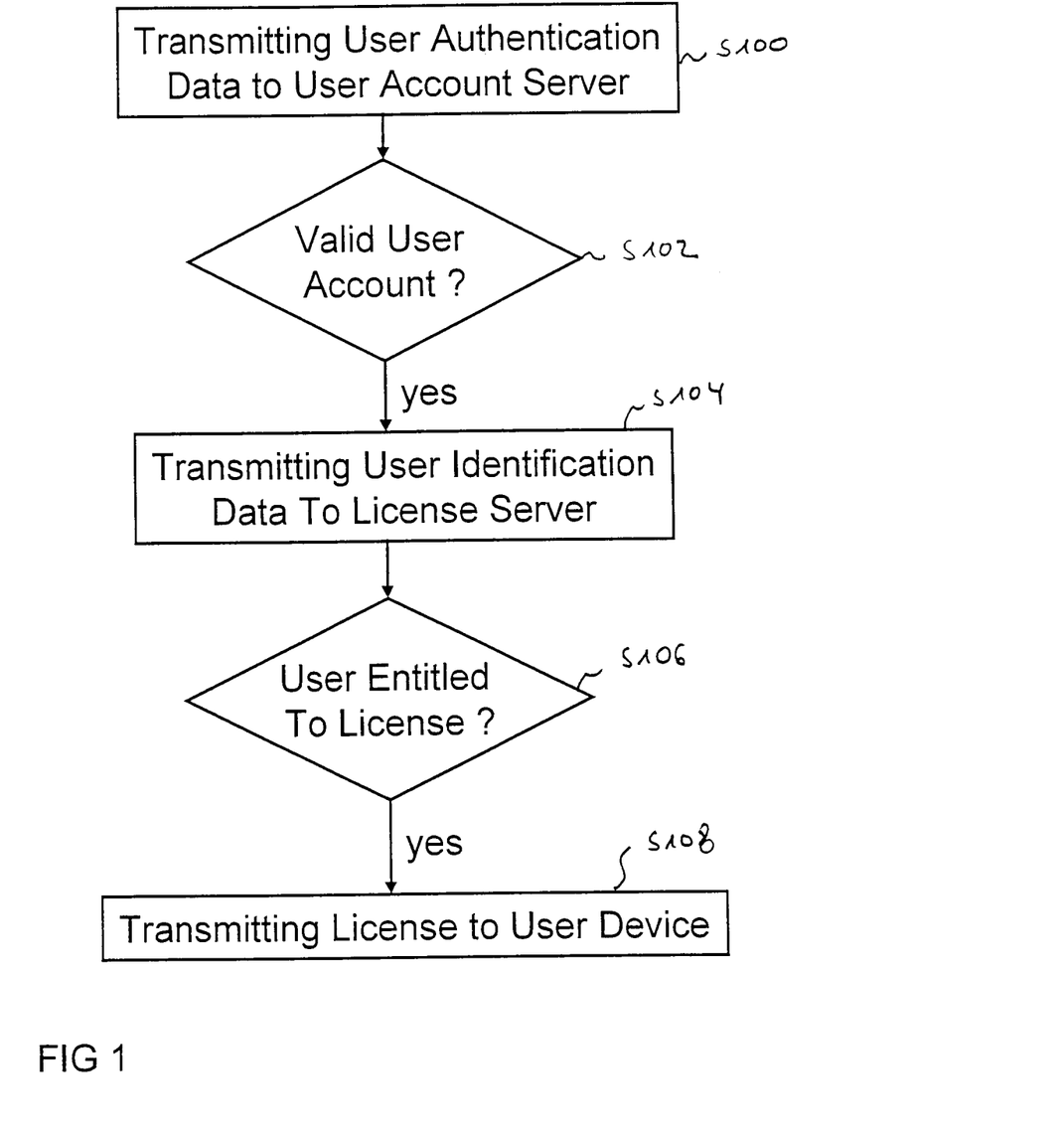
FIG. 1 shows a schematic flow diagram for a method according to an embodiment of the invention.

In FIG. 1 a schematic flow diagram for a method according to an embodiment of the invention is depicted.

In a step S100 a user authentication data is transmitted to a user account server.

The user authentication data may comprise a login, a password, a combination of a password and a login or other data that is related to the user so that the user account server can identify the user. The user authentication data should be known only to the user and not to other users. The login may be a user name. In the following, the term "user authentication data" is used for what the user provides, attempting to identify himself towards the system. The "user authentication data" might also be referred to as "user credentials".

The user account server might be a server installed under the control of a distributor of protected content or of a reseller of protected content. A protected content item might comprise but is not limited to audio files, video files, e-book files, computer games or computer programs, which might be used by an application or computer program running on the user device.

The user device might be a personal computer, a rendering device for playing audio files or video files, like e.g. a television set or a radio, or other devices, e.g. telephones, personal digital assistants, smart phones etc.

In S102 it is checked whether the user account is valid for the user authentication data on the user account server. If a valid user account is present on the user account server, user identification data is transmitted to a license server in S104.

There might be no valid user account if the user has not any user account at all on the user account server, but it might be also that the password is wrong, or that the user account has been invalidated or revoked because for example the user has not paid a user account fee, the user has been misused this user account, e.g. providing other unauthorized persons with user authentication data. This might be identified, e.g. for example by finding out in the user account server that the user is trying to login from a plurality of different geographic locations within a short time. Geographic locations might be identified by an IP address for example.

It is also envisaged that no valid user account is present, because the user account is temporarily disabled, e.g. when the password has been wrong 3 times in a row, the user account might be locked for 24 hours.

The user identification data might be realized as a security token (e.g. a session ID, a user certificate or others). In the following, the term "user identification data" is used for the system's internal data to identify a user in its user account database system (e.g. a unique user ID, which might be embedded additionally into a larger "user certificate").

The license server is a separate server from the user account server. The license server might be installed under the control of a license distributor, e.g. a company providing content protection applications which can be unlocked with decryption keys or licenses.

At the license server it is checked in S106 whether the user is entitled to a license. For instance, the license can be generated in accordance with a digital rights management (DRM) system.

The digital rights management (DRM) system might consider the following checks:
  start date (user receives or otherwise acquires the license not before a start date),
  end date (user does not receive or otherwise acquire any licenses after an end date),
  number of activations within a given timeframe,
  activations on different user devices within a given timeframe,
  number of activations on same user device within a given timeframe,
  number of activations on same user device,
  activations on different user device,
  expiration days (number of days to play until reactivation is necessary),
  number of launches (number of launches to play until re-activation is necessary),
  playtime restriction (number of minutes to play until re-activation is necessary),
  geographical check.

Of course all these checks may be combined, e.g. the protected content can be activated on a defined start date only from one country, or other countries can activate on a different date.

If the user is entitled to a license in S108 the license is transmitted to the user device.

A user is then allowed to access the protected content, e.g. listen to an audio file watch a video file, play a computer game or run a computer program on the user device.

With this method the license is bound to the user account. Only a valid user account is required to authenticate a protected content on a user device, e.g. a computer game on a personal computer. With this approach a publisher or distributor can configure on how many user devices the user can access the content, including even an unlimited number of user devices. Once authenticated on a user device, the protected content can be accessed always on the user device unless the user de-authenticates the license.

Thus, the license is not bound to some sort of identification of the individual purchased item (e.g. a serial number of a protected content) but is only bound to a login of the user. Therefore, a user might use a login to access the protected content. There is no longer a need to search for a serial number. The user might be even allowed to retrieve the login credential if he forgets them. Serial numbers are likely to be generated randomly and include alphanumeric characters. The term is not intended to be understood as sequentially issued numbers.

Figure 2:
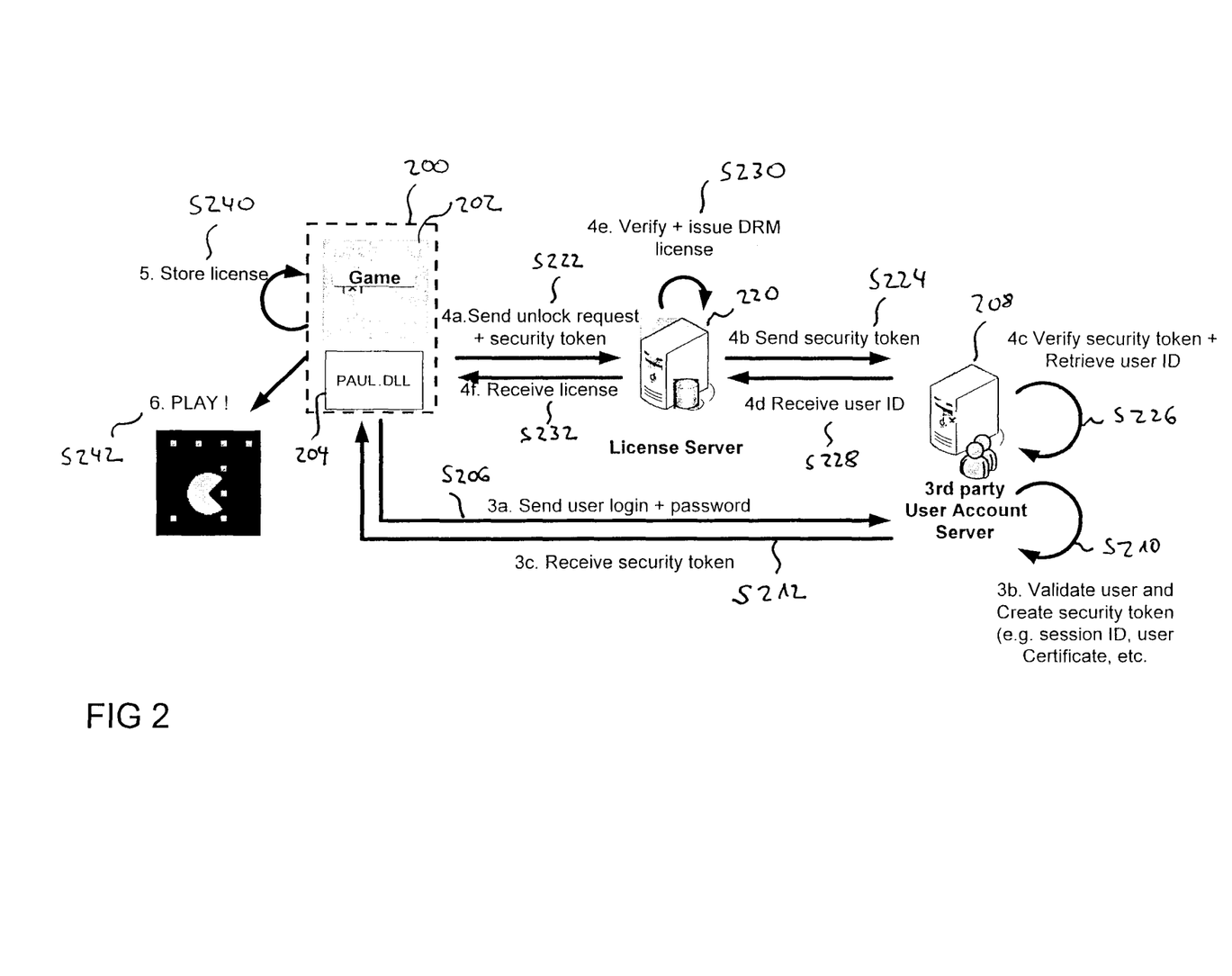
FIG. 2 shows schematically a system according to a further embodiment of the invention.

In FIG. 2 an embodiment of a system according to a further embodiment of the invention is depicted.

In a user device 200 a content protection application 202, e.g. a computer game, as an example for a protected content is installed. The computer game is included in the content protection application 202 in order to ensure the protection of the game as content against unauthorized access.

If the user intends to activate the computer game, a separate software module 204, for instance a dynamic link library DLL, is used to send in a step S206 the user login and password to the user account server 208.

The user account server 208 validates the user and creates a security token (e.g. a session ID, a user certificate or others) in S210 and transmits the security token to the separate software module 204 in S212 if a valid user account is present on the user account server 208.

Afterwards the software module 204 sends the security token together with a request to transmit a license to the license server 220 in a step S222.

The license server 220 sends the security token in S224 to the user account server 208.

In a step S226 the user account server 208 verifies the security token and retrieves the user identification data. The user account server 208 afterwards transmits the user identification data in a step S228 to the license server 220.

In a step S230 the license server 220 verifies the digital rights management licenses and issues a corresponding license in a step S232 to the software module 204, which transfers the license to the content protection application 202.

In a step S240 within the user device 200 the license is stored and afterwards in a step S242 the user can access the protected content, e.g. start to play a computer game.

In some embodiments it is envisaged that the separate software module 204 sends the user login and password to the user account server 208 in step S206 and receives the security token from the user account server 208 in step S212 and afterwards the separate software module 204 transmits the security token to the content protection application 202, which sends the security token to the license server 220 in step S222 and which receives the license in step S232 from the license server 220.

A further possibility is that the content protection application 202 sends the user login and password to the user account server 208 in step S206 and receives the security token from the user account server 208 in step S212 and afterwards the content protection application 202 transmits the security token to the separate software module 204, which sends the security token to the license server 220 in step S222 and which receives the license in step S232 from the license server 220.

According to a further embodiment, the content protection application 202 sends the user login and password to the user account server 208 in step S206 and receives the security token from the user account server 208 in step S212 and afterwards the content protection application 202 transmits the security token to the license server 220 in step S222 and receives the license in step S232 from the license server 220.

Within these embodiments, there is no user login data stored in the license server. Therefore, the user data is handled only in the user account server, which gives a higher security for the user data, which if released, could be abused.

The license server 220, the user account server 208 and the user device 200 might be connected by the internet or any other suitable network.

Figure 3:
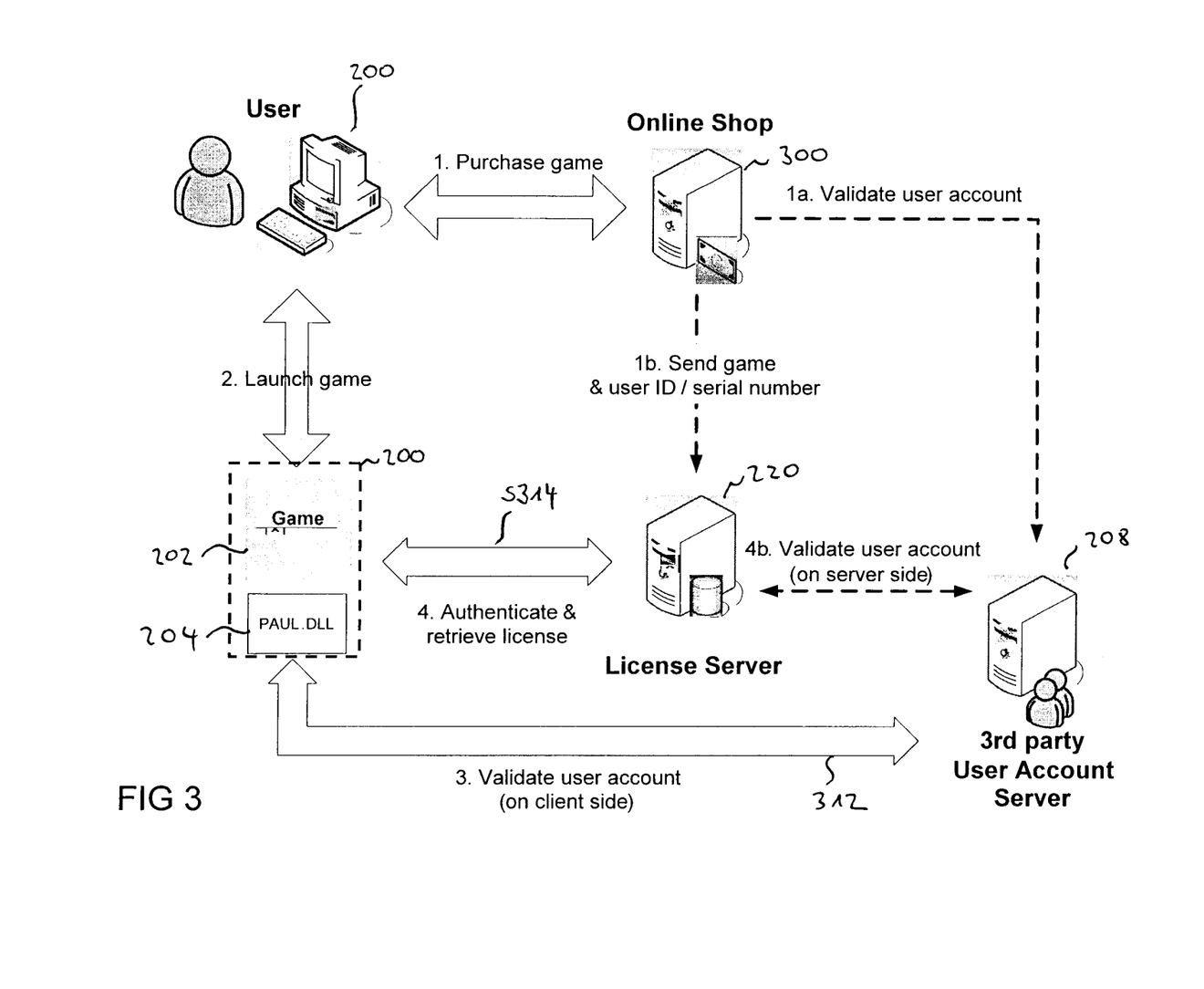
FIG. 3 shows schematically a system according to a further embodiment of the invention.

In FIG. 3 a further schematic diagram according to a further embodiment of the invention is depicted.

According to this embodiment a user purchases a protected content, e.g. a game, by communication with an online shop server 300. The online shop server 300 validates the user account in a step S302 at the user account server 208 and sends a game identification, the user identification data and, optionally, the serial number, to the license server 220.

When afterwards the user launches the game in a step S310, the user account is validated in a step S312 at the user account server 208. In case of the positive validation the user device 200 retrieves a license from the license server 220 in step S314.

The license server 220 checks together with a user account server 208 whether the user account is valid. In case the user account is valid, the license server 220 issues a license to the user device 200 and the game can be launched.

Figure 4:
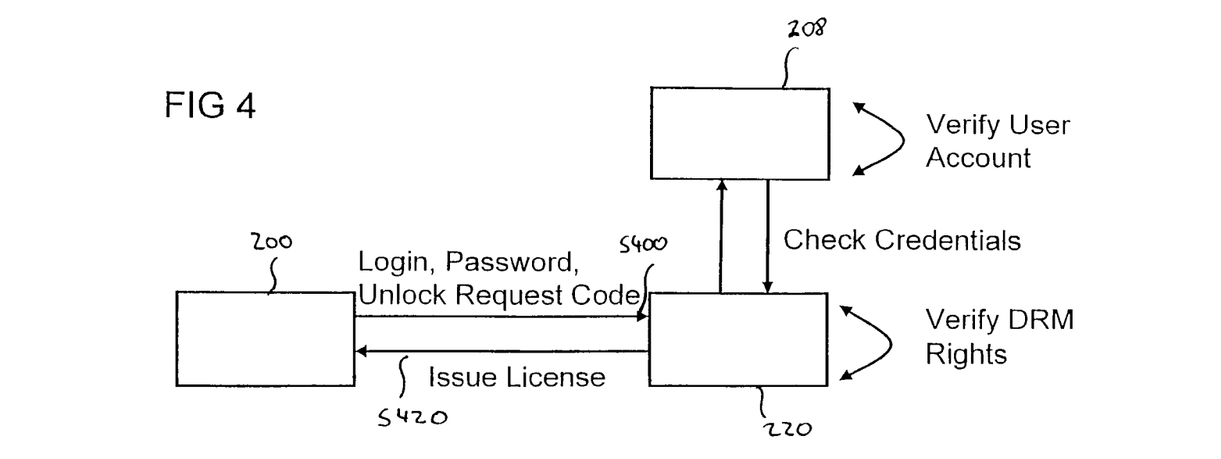
FIG. 4 shows schematically a system according to a further embodiment of the invention.

In FIG. 4 a schematic diagram according to a further embodiment of the invention is depicted.

In this embodiment the user device 200 transmits the user authentication data, e.g. a login and a password together with an unlock request code in a step S400 to the license server 220. The license server 220 checks the user authentication data with the user account server 208. Within the user account server 208 the user account is verified and in case of a valid user account the license server 220 verifies the corresponding digital rights management rights. If the user is entitled to access the protected content the license server 220 issues the license in a step S420 to the user device 200.

Within this embodiment the user authentication data is transmitted from the user device 200 to the user account server 208 via the license server 220.

Figure 5:
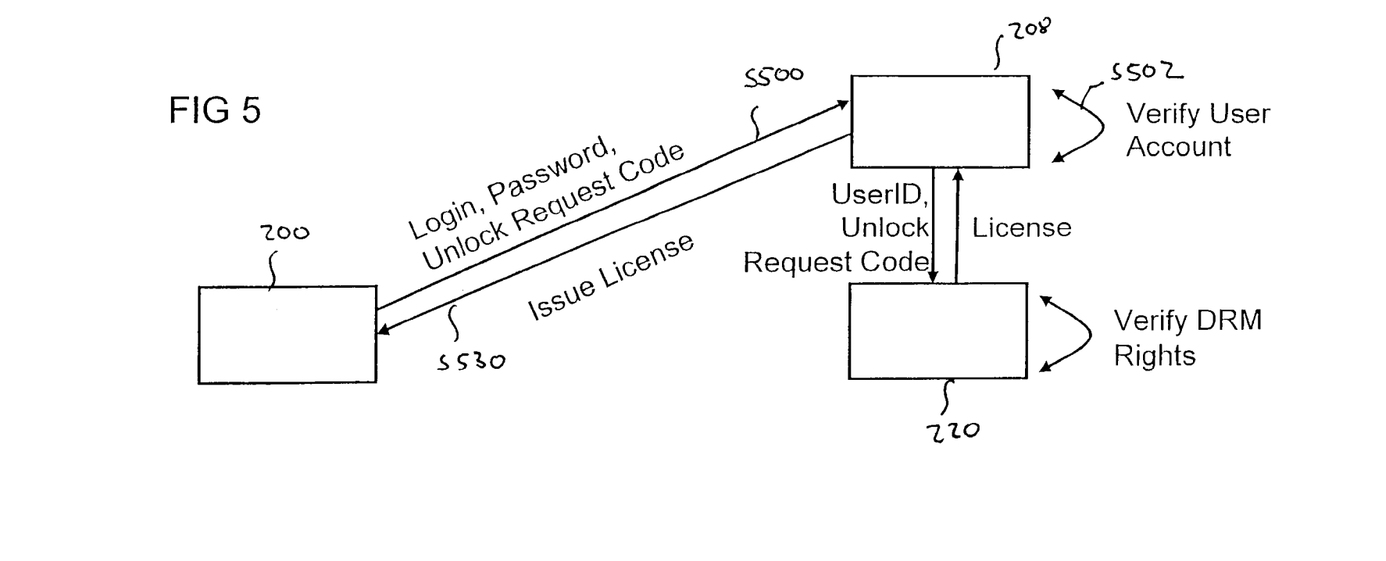
FIG. 5 shows schematically a system according to a further embodiment of the invention.

In FIG. 5 a further embodiment according to the invention is schematically depicted.

In this embodiment the user device 200 transmits the user authentication data, e.g. a login and a password together with an unlock request code in a step S500 to the user account server 208.

The user account server verifies in the step S502 whether a valid user account is available and afterwards transmits the user identification and an unlock request code to the license server 220. Within the license server 220 it is checked whether the corresponding DRM rights are available for the user identification of user ID.

In the case of a positive verification of the DRM rights the license is provided from the license server 220 to the user account server 208. Afterwards the user account server 208 issues the license to the user device 200 in a step S530.

In this embodiment the license is transmitted from the license server 220 to the user device 200 via the user account server 208.

Figure 6:
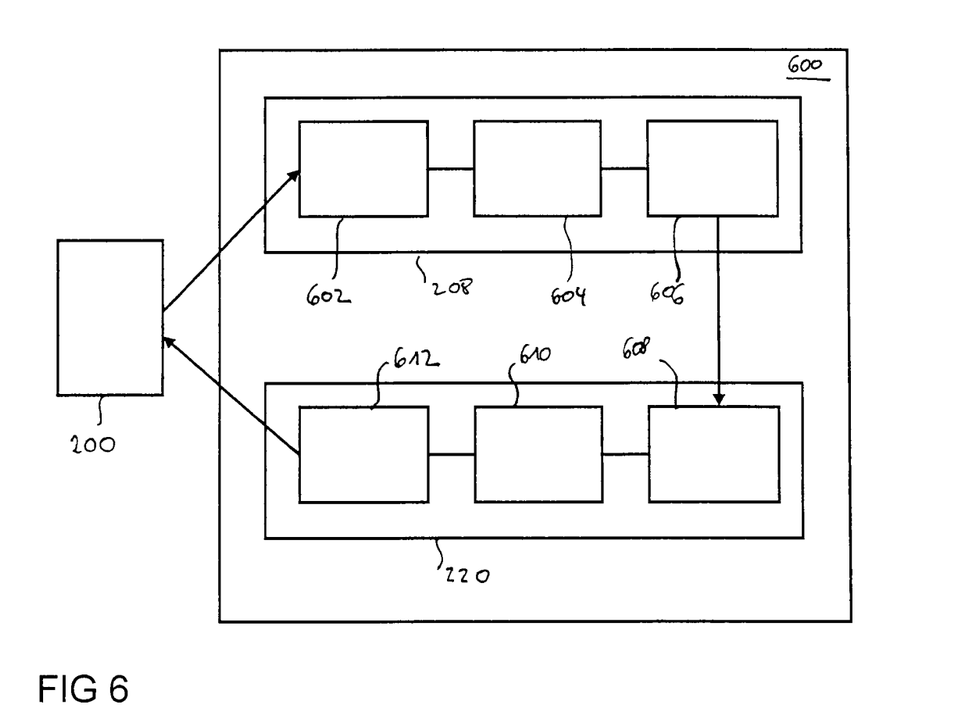
FIG. 6 shows schematically a system according to a further embodiment of the invention and FIG. 7 shows schematically a software module according to a further embodiment of the invention.

In FIG. 6 a system for providing a license for accessing a protected content on a user device 200 is depicted according to a further embodiment of the invention.

The system 600 comprises a user account server 208 and a license server 220.

The user account server 208 includes a first receiver 602 configured to receive user authentication data from the user device 200. It further comprises a first control unit 604 configured to check whether the user authentication data corresponds to a valid user account of the user on the user account server 208. Further, the user account server 208 comprises a first transmitter 606 configured to transmit user identification data to the license server 220 if the user has a valid user account.

The license server 220 includes a second receiver 608 configured to receive the user identification data. The license server 220 further includes a second control unit 610 configured to check whether the user is entitled to the license and whether the user identification data is received and it further includes a second transmitter 612 configured to transmit the license to the user device 200 if the user identification data is received and if the user is entitled to the license.

Figure 7:
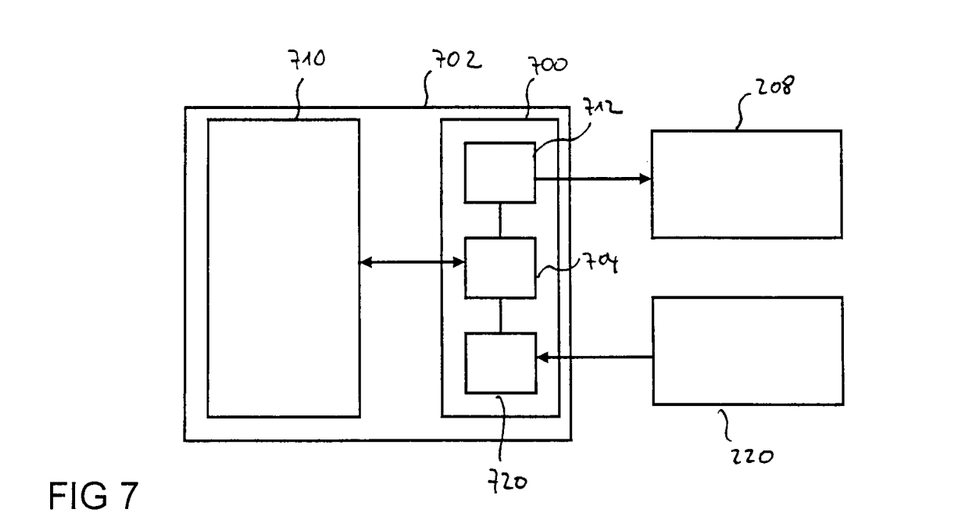

In FIG. 7 a software module 700, e.g. the separate software module 204, is schematically depicted according to a further embodiment of the invention. The software module 700 is configured to run on a user device 702 and comprises a communication module 704 configured to communicate with a content protection application 710 on the user device 702.

The software module 700 further comprises a transmitting module 712 configured to send user authentication data from the user device 702 to the user account server 208 if the content protection application 710 requests a license from the software module 700.

The software module 700 further comprises a receiving module 720 configured to receive the license from the license server 220 different from the user account server 208. If the software module 700 has received the license from the license server 220 the communication module is used to provide a content protection application 710 with the license and the content protection application afterwards uses the license to e.g. decrypt the content or to allow the running of a computer program or game on the user device 702.

With some of the proposed embodiments it is also envisaged that the user purchases a protected content that is stored on a data carrier, e.g. a computer game or a video file on a Compact Disc (CD) or a Digital Versatile Disc (DVD) or a Blu-ray-Disc in a shop. If the content is protected by the content protection application 710, the software module 700 might be already installed on the user device 200 or might be stored on the data carrier as well. The shop where the user has bought the data carrier interoperates with the user account server, to which the software module 700 sends the user authentication data. In accordance with the embodiments of the invention, a license is provided by the license server to the software module 700 afterwards.

The separate software module 700 might also be used to request the license in cooperation with the user account server 208, the license server 220 and a separate license handling application in parallel or prior when the protected content is downloaded, e.g. from the online shop server 300 depicted in FIG. 3. Thus, the user is enabled to start earlier accessing the protected content, since the license might be available at the user device 200 already before the protected content is completely downloaded from the online shop server 300. The separate license handling application is also included into a content protection application, as it has been described with regard to the computer game in FIG. 2.

The proposed method, system and server provide a high flexibility to the user for requesting licenses. For instance the user might select between different licenses before the user goes online to obtain the license. The user may choose a onetime start license, or a license valid for a certain predetermined number of days, or forever. The license server 220 can check the corresponding digital right management rights against the request from the user and provide the corresponding license to the user device 200.

In some embodiments it is also envisaged that a user de-activates or revokes an existing license. Therefore, if a user has purchased a license for a certain number of days the user might first apply for e.g. ten days of license, but de-activate the license after eight days by transmitting a de-activation request to the license server, which afterwards transmits a command to de-activate the license on the user device.

Further, in some embodiments it is envisaged that first the license is de-activated on the user device with a de-activation command, and afterwards a de-activation confirmation is transmitted to the license server.

Afterwards it is envisaged that the user can re-activate the license for further use, e.g. for the remaining two days at a later time with a request at the license server Since the user data is checked in the user account server it is not necessary to store a user login data in the license server. This might give a further security to the user. The user account server might be a more trustable server, since the user has used it already for e.g. other online processes, e.g. purchases of books, audio files or other items.

Although specific embodiments have been illustrated and described herein, it will be appreciated by those of ordinary skill in the art that a variety of alternate and/or equivalent implementations may be substituted for the specific embodiments shown and described without departing from the scope of the described embodiments. This application is intended to cover any adaptations or variations of the specific embodiments discussed herein. Therefore, it is intended that this invention be limited only by the claims and the equivalents thereof.

The invention claimed is:

1. A method for providing a license to a user for accessing a protected content on a user device, comprising:
    transmitting user login data from the user device to a user account server connected to the user device through a communication network;
    retrieving from the user account server, user identification data based on the user login data, the user identification data identifying the user in the user account server and not including the user login data;
    transmitting the user identification data not including the user login data from the user account server to a license server connected to the user device and the user account server through a communication network, only when the user login data corresponds to a valid user account on the user account server;
    checking at the license server, whether the user identified by the user identification data transmitted from the user account server is entitled to the license; and
    transmitting the license from the license server to the user device only when the user identified by the user identification data transmitted from the user account server is deemed entitled to the license.

2. The method for providing a license according to claim 1, wherein
    the license specifies at least one of a start date for accessing the protected content, an end date, a number of activations within a given timeframe, a number of activations on the user device within a given timeframe, a number of activations on other user devices within a given timeframe, activations on different user device, expiration days, number of launches, playtime restrictions, and geographical restrictions.

3. The method for providing a license according to claim 1, wherein the user login data is transmitted from the user device to the user account server via the license server.

4. The method for providing a license according to claim 1, wherein the license is transmitted from the license server to the user device via the user account server.

5. The method for providing a license according to claim 1, further comprising:
    de-activating a license by performing a de-activation command on the user device and transmitting a de-activation confirmation from the user device to the license server.

6. The method for providing a license according to claim 1, further comprising:
    transmitting a security token from the user account server to the user device;
    transmitting the security token from the user device to the license server;
    transmitting the security token from the license server to the user account server; and
    validating the security token by the user account server.

7. The method for providing a license according to claim 1, wherein the user login data is transmitted after a content protection application for accessing the protected content is launched on the user device.

8. The method for providing a license according to claim 1, further comprising:
    purchasing the protected content by communication with an online shop server;
    verifying the user login data by the online shop server at the user account server;
    transmitting the user identification data and content identification from the online shop server to the license server.

9. The method for providing a license according to claim 1, wherein the license is only bound to the valid user account.

10. The method for providing a license according to claim 1, wherein the license server is a different server than the user account server.

11. A system providing a license for accessing a protected content on a user device, comprising:
    a user account server connected to the user device through a communication network and including
        a first receiver configured to receive user login data from the user device,
        a first control unit configured to check whether the user login data corresponds to a valid user account of the user on the user account server; and
        a first transmitter configured to transmit user identification data to a license server only when the user has a valid user account, the user identification data being retrieved, based on the user login data, from the user account server, the user identification data identifying the user in the user account server and not including the user login data; and
    a license server connected to the user device and the user account server through a communication network and including
        a second receiver configured to receive the user identification data not including the user login data, a second control unit figured to check, whether the user identified by the received user identification data is entitled to the license and whether the user identification data is received;

a second transmitter configured to transmit the license to the user device, only when the user is entitled to the license.

12. A system for providing a license according to claim 11, further comprising circuitry configured to execute a software module and a content protection application within the user device, wherein the software module is configured to transmit the user login data to the user account server, to receive a security token from the user account server, and to transmit the security token to the content protection application and wherein the content protection application is configured to transmit the security token and an unlock request to the license server and to receive the license from the license server.

13. A system for providing a license according to claim 11, further comprising circuitry configured to execute a software module and a content protection application within the user device, wherein the software module is configured to transmit the user login data to the user account server, to receive a security token from the user account server, to transmit the security token and an unlock request to the license server to receive the license from the license server and to transmit the license to the content protection application.

14. A license server for providing a license to a user for accessing a protected content on a user device, comprising:

a receiver configured to receive user identification data from a user account server through a communication network, wherein the user identification data indicates that a valid user account exists on the user account server and the received user identification data does not include user login data, wherein the user login data is used to check, in the user account server, whether a valid user account exists;

a control unit configured to check whether the user identified by the received user identification data is entitled to the license; and a transmitter configured to transmit the license to the user device through a communication network, only when the user is entitled to the license.

* * * * *